United States Patent
Kim et al.

(10) Patent No.: US 7,772,772 B2
(45) Date of Patent: Aug. 10, 2010

(54) GREEN PHOSPHOR AND PLASMA DISPLAY PANEL USING THE SAME

(75) Inventors: Hyang-Mi Kim, Pohang-shi (KR); Soon-Rewl Lee, Ahnyang-shi (KR); Sung-Ho Woo, Daegu (KR)

(73) Assignee: LG Electronics Inc., Seoul (KR)

( * ) Notice: Subject to any disclaimer, the term of this patent is extended or adjusted under 35 U.S.C. 154(b) by 455 days.

(21) Appl. No.: 10/565,809

(22) PCT Filed: Jul. 24, 2004

(86) PCT No.: PCT/KR2004/001838

§ 371 (c)(1),
(2), (4) Date: Nov. 13, 2007

(87) PCT Pub. No.: WO2005/010121

PCT Pub. Date: Feb. 3, 2005

(65) Prior Publication Data

US 2008/0048548 A1  Feb. 28, 2008

(30) Foreign Application Priority Data

Jul. 25, 2003  (KR) ............... 10-2003-0051306

(51) Int. Cl.
*C09K 11/64* (2006.01)
*H01J 9/00* (2006.01)
*H01J 17/49* (2006.01)

(52) U.S. Cl. .............. 313/582; 313/486; 313/586; 313/587; 313/487; 252/301.4 R

(58) Field of Classification Search ......... 313/580–587
See application file for complete search history.

(56) References Cited

U.S. PATENT DOCUMENTS

| 6,380,669 | B1 | 4/2002 | Zachau et al. ........... 313/487 |
| 6,454,967 | B1 * | 9/2002 | Im et al. ........... 252/301.4 R |
| 2001/0003410 | A1 | 6/2001 | Haruki et al. |
| 2002/0113552 | A1 | 8/2002 | Juestel et al. |
| 2002/0195938 | A1 * | 12/2002 | Kawamura ........... 313/582 |
| 2003/0085853 | A1 | 5/2003 | Shiiki et al. |
| 2003/0173542 | A1 * | 9/2003 | Fukuta et al. ........ 252/301.4 R |

FOREIGN PATENT DOCUMENTS

| EP | 0 932 185 A1 | 7/1999 |
| JP | 2002-117760 | 4/2002 |
| JP | 2003-7215 | 1/2003 |

OTHER PUBLICATIONS

Rao, R. P.; "$Tb^{3+}$ Activated Green Phosphors for Plasma Display Panel Applications"; Journal of the Electrochemical Society, vol. 150, No. 8, Jun. 16, 2003, pp. H165-H171, (XP-002515227).
European Search Report dated Mar. 24, 2009.

\* cited by examiner

*Primary Examiner*—Sikha Roy
*Assistant Examiner*—Tracie Green
(74) *Attorney, Agent, or Firm*—KED & Associates, LLP

(57) ABSTRACT

There is disclosed a green phosphor that is adaptive for improving its driving voltage and brightness characteristic, and at the same time, improving its color purity. A green phosphor according to an embodiment of the present invention includes a mixed phosphor composed of a first class phosphor of $Zn_2SiO_4$:Mn, a second class phosphor of at least one of $LaPO_4$:Tb, $Y_3Al_3(BO_3)_4$Tb, Y(Al, Ga)5012:Tb, $YBO_3$:Tb, (Y, Gd)$BO_3$:Tb, and a third class phosphor of at least one of $BaAl_{12}O_{19}$:Mn, $BaAl_{14}O_{23}$:Mn, Ba(Sr, Ma)AlO:Mn, and the mixing rate of the third class phosphor to the total weight of the mixed phosphor is 1~25 wt %.

7 Claims, 1 Drawing Sheet

GREEN PHOSPHOR AND PLASMA DISPLAY PANEL USING THE SAME

This application claims priority to International Application No. PCT/KR2004/001838, filed Jul. 24, 2004, published on Feb. 3, 2005, Publication No. WO 2005/010121 A1 in the Korean language and claims priority to Korean Application No. 10-2003-0051306, filed Jul. 25, 2003. The entire disclosure of the prior applications are considered as being part of the disclosure of the present application and are hereby incorporated by reference herein.

TECHNICAL FIELD

This invention relates to a plasma display panel, and more particularly to a green phosphor that is adaptive for improving its driving voltage and brightness characteristic, and at the same time, improving its color purity.

BACKGROUND ART

A plasma display panel has been the center of attention as the next generation display device which has the highest practicality among flat panel displays. That is, the plasma display panel has high brightness and wide viewing angle so that it can be applicable widely as a thin type of large-sized display such as an outdoor advertising tower, a wall TV or a theater display.

Generally, a plasma display panel displays a picture by use of a visible ray emitted by irradiating a phosphor with the ultraviolet generated by the discharge of the inert gas sealed inside a discharge cell.

FIG. 1 is a diagram representing the structure of a typical three electrode surface discharge type plasma display panel.

Referring to FIG. 1, a typical plasma display panel includes a scan electrode 2Y and a common electrode 2Z on an upper substrate 1; and a data electrode 6X formed on a lower substrate 5. At this moment, the scan electrode 2Y and the common electrode 2Z are formed in a direction to cross the data electrode 6X. And, the scan electrode 2Y and the common electrode 2Z constitute a pair of electrodes, and a plurality of such electrode pairs are arranged on the panel.

Also, an upper dielectric layer 3 and a protective film 4 are sequentially deposited on the upper substrate 1, and a lower dielectric layer 7 and barrier ribs 8 are formed on the lower substrate 5. And, Phosphor is spread over the surface of the lower dielectric layer 7 and the barrier ribs 8 to form a phosphor layer 9. A discharge cell is formed at an area where the scan electrode 2Y and the common electrode 2Z cross the data electrode 6X.

Herein, the phosphor might include a red phosphor, a green phosphor and a blue phosphor. Each phosphor is spread along the inner wall of each barrier rib 8. For example, the red phosphor might be (Y, Gd)BO$_3$:Eu phosphor, the green phosphor might be Zn$_2$SiO$_4$:Mn (hereinafter referred to as ZSM) phosphor, and the blue phosphor might be BaMgAl$_{10}$O$_{17}$EU.

However, the ZSM phosphor used as the green phosphor has a lower dielectric constant than the red phosphor and the blue phosphor and has negative surface potential. Accordingly, the ZSM phosphor has higher discharge voltage upon driving to act as a cause for reducing its voltage margin and as a cause for resulting in miswriting or the deviation of inversion characteristic.

(Y, Gd)BO$_3$:Tb (hereinafter referred to as YBT) phosphor and BaAl12O19:Mn (hereinafter, referred to as BAM-G) phosphor might be used as the green phosphor other than the ZSM phosphor. However, the YBT phosphor has a characteristic that its purity is inferior to P22 for cathode ray tube CRT and the range of color reproduction become narrow, thereby deteriorating the picture quality. At the same time, BAM-G phosphor has a problem that its deterioration gets bigger upon driving.

DISCLOSURE

Technical Problem

Accordingly, it is an object of the present invention to provide a green phosphor that is adaptive for improving its driving voltage and brightness characteristic, and at the same time, improving its color purity.

It is another object of the present invention to provide a plasma display panel using the green phosphor.

Technical Solution

In order to achieve these and other objects of the invention, a green phosphor according to one aspect of the present invention is composed of Zn$_2$SiO$_4$:Mn phosphor, (Y, Gd)BO$_3$:Tb phosphor and BaAl$_{12}$O$_{19}$:Mn phosphor, and the mixing rate of BaAl$_{12}$O$_{19}$:Mn phosphor to the total weight is 1~25 wt %.

A green phosphor according to another aspect of the present invention is composed of Zn$_2$SiO$_4$:Mn phosphor, (Y, Gd)BO$_3$:Tb phosphor and BaAl$_{12}$O$_{19}$:Mn phosphor, and the mixing rate of the (Y, Gd)BO$_3$:Tb phosphor to the Zn$_2$SiO$_4$:Mn phosphor is 25~80 wt %.

Herein, the mixing rate of the BaAl$_{12}$O$_{19}$:Mn phosphor to the total weight of the green phosphor is 1~25 wt %.

A plasma display panel according to still another aspect of the present invention includes a plurality of electrodes arranged with having a first and a second sustain electrode form a pair on an upper substrate; a plurality of data electrodes arranged on a lower substrate to cross the electrodes; a plurality of barrier ribs arranged in parallel to the data electrodes with a designated gap to form a discharge space between the upper substrate and the lower substrate; and a plurality of phosphorus layers having a red phosphorus layer, a green phosphorus layer and a blue phosphorus layer which are formed along the inner wall of the barrier ribs, and wherein the green phosphorus layer is made of Zn$_2$SiO$_4$:Mn phosphor, (Y, Gd)BO$_3$:Tb phosphor and BaAl$_{12}$O$_{19}$:Mn phosphor, and the mixing rate of BaAl$_{12}$O$_{19}$:Mn phosphor to the total weight is 1~25 wt %.

A plasma display panel according to still another aspect of the present invention includes a plurality of electrodes arranged with having a first and a second sustain electrode form a pair on an upper substrate; a plurality of data electrodes arranged on a lower substrate to cross the electrodes; a plurality of barrier ribs arranged in parallel to the data electrodes with a designated gap to form a discharge space between the upper substrate and the lower substrate; and a plurality of phosphorus layers having a red phosphorus layer, a green phosphorus layer and a blue phosphorus layer which are formed along the inner wall of the barrier ribs, and wherein the green phosphorus layer is made of Zn$_2$SiO$_4$:Mn phosphor, (Y, Gd)BO$_3$:Tb phosphor and BaAl$_{12}$O$_{19}$:Mn phosphor, and the mixing rate of the (Y, Gd)BO$_3$:Tb phosphor to the Zn$_2$SiO$_4$:Mn phosphor is 25~80 wt %.

Herein, the mixing rate of the BaAl$_{12}$O$_{19}$:Mn phosphor to the total weight of the green phosphorus layer is 1~25 wt %.

A green phosphor according to still another aspect of the present invention includes a mixed phosphor composed of a first class phosphor of Zn$_2$SiO$_4$:Mn, a second class phosphor of at least one of LaPO$_4$:Tb, Y$_3$Al$_3$(BO$_3$)$_4$Tb, Y(Al, Ga)$_5$O$_{12}$:Tb, YBO$_3$:Tb, (Y, Gd)BO$_3$:Tb, and a third class phosphor of at least one of BaAl$_{12}$O$_{19}$:Mn, BaAl$_{14}$O$_{23}$:Mn, Ba(Sr,Ma)AlO:Mn, and the mixing rate of the third class phosphor to the total weight of the mixed phosphor is 1~25 wt %.

A green phosphor according to still another aspect of the present invention includes a mixed phosphor composed of a first class phosphor of Zn$_2$SiO$_4$:Mn, a second class phosphor of at least one of LaPO$_4$:Tb, Y$_3$Al$_3$(BO$_3$)$_4$Tb, Y(Al, Ga)$_5$O$_{12}$:Tb, YBO$_3$:Tb, (Y, Gd)BO$_3$:Tb, and a third class phosphor of at least one BaAl$_{12}$O$_{19}$:Mn, BaAl$_{14}$O$_{23}$:Mn, Ba(Sr,Ma)AlO:Mn, and the mixing rate of the second class phosphor to the first class phosphor is 25~80 wt %.

Herein, the mixing rate of the third class phosphor to the total weight of the mixed phosphor is 1~25 wt %.

A green phosphor according to still another aspect of the present invention has a BAM group phosphor of at least one of BaAl12O19:Mn, BaAl14O23:Mn, Ba(Sr,Ma)AlO:Mn mixed with at least one type of phosphor that has a different composition from the BAM group phosphor, and the mixing rate of the BAM group phosphor to the total weight is 1~25 wt %.

A green phosphor according to still another aspect of the present invention includes a mixed phosphor in which a first class phosphor of Zn$_2$SiO$_4$:Mn is mixed with a second class phosphor of at least one of LaPO$_4$:Tb, Y$_3$Al$_3$(BO$_3$)$_4$Tb, Y(Al, Ga)$_5$O$_{12}$:Tb, YBO$_3$:Tb, (Y, Gd)BO$_3$:Tb, and the mixing rate of the second phosphor to the first class phosphor is 25~80 wt %.

Herein, the mixed phosphor further includes a third class phosphor of at least one of BaAl$_{12}$O$_{19}$:Mn, BaAl$_{14}$O$_{23}$:Mn, Ba(Sr,Ma)AlO:Mn.

A plasma display panel according to still another aspect of the present invention includes a plurality of electrodes arranged with having a first and a second sustain electrode form a pair on an upper substrate; a plurality of data electrodes arranged on a lower substrate to cross the electrodes; a plurality of barrier ribs arranged in parallel to the data electrodes with a designated gap to form a discharge space between the upper substrate and the lower substrate; and a plurality of phosphorus layers having a red phosphorus layer, a green phosphorus layer and a blue phosphorus layer which are formed along the inner wall of the barrier ribs, and wherein the green phosphorus layer is composed of a first class phosphor of Zn$_2$SiO$_4$:Mn, a second class phosphor of at least one of LaPO$_4$:Tb, Y$_3$Al$_3$(BO$_3$)$_4$Tb, Y(Al, Ga)$_5$O$_{12}$:Tb, YBO$_3$:Tb, (Y, Gd)BO$_3$:Tb, and a third class phosphor of at least one of BaAl$_{12}$O$_{19}$:Mn, BaAl$_{14}$O$_{23}$:Mn, Ba(Sr,Ma)AlO:Mn, and the mixing rate of the third class phosphor to the total weight is 1~25 wt %.

A plasma display panel according to still another aspect of the present invention includes a plurality of electrodes arranged with having a first and a second sustain electrode form a pair on an upper substrate; a plurality of data electrodes arranged on a lower substrate to cross the electrodes; a plurality of barrier ribs arranged in parallel to the data electrodes with a designated gap to form a discharge space between the upper substrate and the lower substrate; and a plurality of phosphorus layers having a red phosphorus layer, a green phosphorus layer and a blue phosphorus layer which are formed along the inner wall of the barrier ribs, and wherein the green phosphorus layer is composed of a first class phosphor of Zn$_2$SiO$_4$:Mn, a second class phosphor of at least one of LaPO$_4$:Tb, Y$_3$Al$_3$(BO$_3$)$_4$Tb, Y(Al, Ga)$_5$O$_{12}$:Tb, YBO$_3$:Tb, (Y, Gd)BO$_3$:Tb, and a third class phosphor of at least one of BaAl$_{12}$O$_{19}$:Mn, BaAl$_{14}$O$_{23}$:Mn, Ba(Sr,Ma)AlO:Mn, and the mixing rate of the second class phosphor to the first class phosphor is 25~80 wt %.

Herein, the mixing rate of the third class phosphor to the total weight of the green phosphorus layer is 1~25 wt %.

Advantageous Effect

As described above, the plasma display panel of the present invention forms the green phosphor by mixing the ZSM phosphor, the YBT phosphor and the BAM-G phosphor, wherein the mixing rate of BAM-G phosphor is 1~25% to the total weight, thus the driving voltage and brightness characteristic might be improved and at the same time the color purity might be improved.

BEST MODE FOR THE INVENTION

Figure 1:
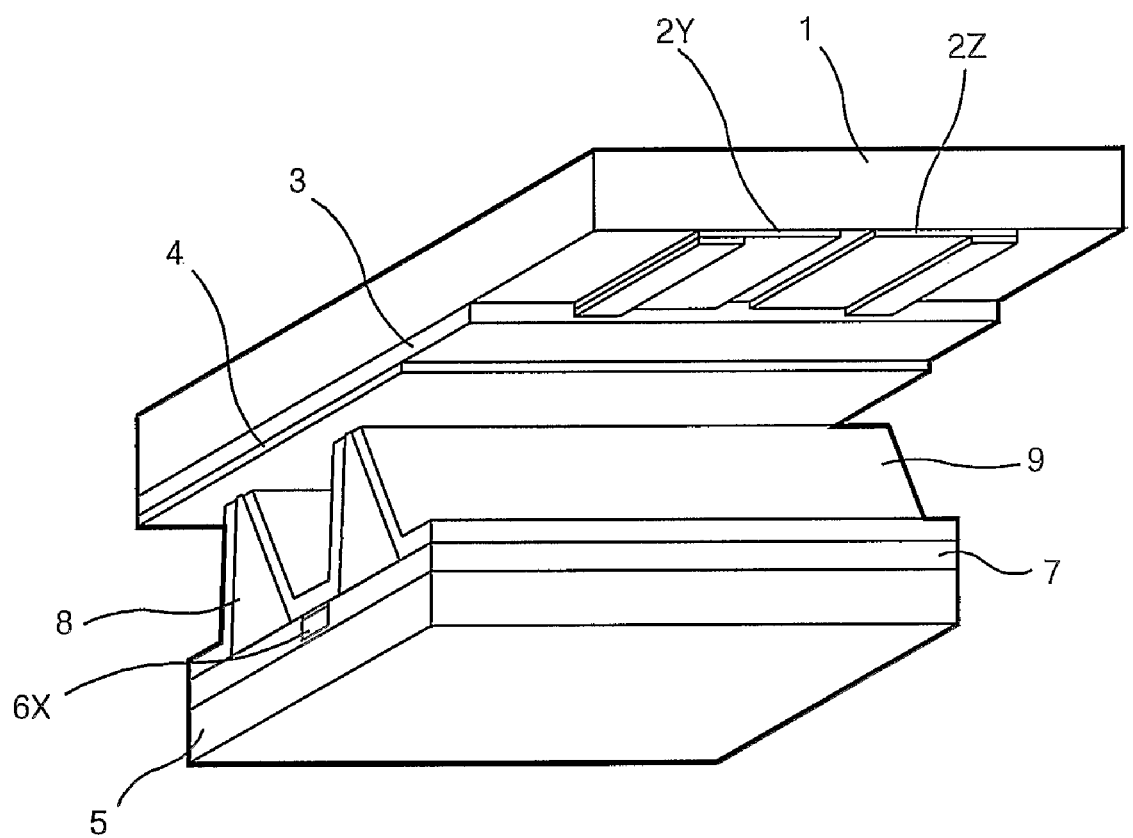
FIG. 1 is a diagram representing the structure of a three electrode surface discharge type plasma display panel.

These and other objectives and advantages of the present invention will be apparent from the description, by way of embodiments of the present invention, with reference to the appended drawings.

The preferred embodiments of the present invention will now be described in detail.

The present invention, in order to solve the problem of ZSM, a green phosphor, which is generally used, realizes the green phosphor by mixing a first class phosphor, a second class phosphor and a third class phosphor, and determines the optimal mixing rate of the mixed phosphor on the basis of the result of experiment. Herein, the first class phosphor is Zn$_2$SiO$_4$:Mn, the second class phosphor is at least one of LaPO$_4$:Tb, Y$_3$Al$_3$(BO$_3$)$_4$Tb, Y(Al, Ga)$_5$O$_{12}$:Tb, YBO$_3$:Tb, (Y, Gd)BO$_3$:Tb, and the third class phosphor is at least one of BaAl$_{12}$O$_{19}$:Mn, BaAl$_{14}$O$_{23}$:Mn, Ba(Sr,Ma)AlO:Mn.

In relation to two component compound of the ZSM phosphor selected as the first class phosphor and the YBT phosphor selected as the second class phosphor, the result of the experiment carried out regarding optical characteristic, aging rate and electrical characteristic is shown as the following table 1.

TABLE 1

|  |  |  | ZSM (Base) | ZSM:YBT (0.75:0.25) | ZSM:YBT (0.5:0.5) |
|---|---|---|---|---|---|
| Optical Characteristic | Color Coordinate | X | 0.233 | 0.249 | 0.257 |
|  |  | Y | 0.726 | 0.705 | 0.693 |
|  | Initial Brightness (%) |  | 100 | 107 | 98-100 |
| Aging Rate | 72 (hr) |  | −15 | −6 | −1 |
| Electrical Characteristic | Discharge initiating voltage (V) |  | 236 | 231 | 222 |

As shown in Table 1, in case that the mixing rate of the YBT phosphor is increased, it is known that the initial brightness characteristic becomes excellent and the decreasing range of the aging rate is reduced. Further, as the mixing rate of the YBT phosphor increases, the discharge initiating voltage is reduced to make the electrical characteristic excellent.

Next, in relation to two component compound of the ZSM phosphor selected as the first class phosphor and the BAM-G phosphor selected as the third class phosphor, the result of the experiment carried out regarding optical characteristic, aging rate and electrical characteristic is shown as the following table 2.

TABLE 2

|  |  |  | ZSM (Base) | ZSM:BAM-G (0.75:0.25) | ZSM:BAM-G (0.5:0.5) |
|---|---|---|---|---|---|
| Optical Characteristic | Color Coordinate | X | 0.242 | 0.226 | 0.206 |
|  |  | Y | 0.717 | 0.725 | 0.736 |
|  | Initial Brightness (%) |  | 100 | 103 | 107 |
| Aging Rate | 72 (hr) |  | −20.1 | −27.1 | −26.3 |
| Electrical Characteristic | Discharge initiating voltage (V) |  | 240 | 232 | 207 |

As shown in Table 2, as the mixing rate of the BAM-G phosphor increases, the optical characteristic becomes excellent to make the color reproduction property get better accordingly. Further, as the mixing rate of the BAM-G increases, the initial brightness characteristic is known to increase from 100% to 103~107% only when it is base phosphor (ZSM phosphor) Accordingly, as the mixing rate of the BAM-G phosphor increases, the initial brightness characteristic becomes excellent. However, when only ZAM phosphor constitutes the base phosphor, the aging rate decreases from −20.3% to −27.1% or −26.3% as the mixing rate of the BAM-G increases. Also, the discharge initiating voltage, when it is only the base phosphor (base phosphor), decreases at 240V linearly to have excellent electrical characteristic as the mixing rate of the BAM-G increases.

After all, the two component compound of the ZAM phosphor and the BAM-G phosphor has excellent color purity and initial brightness characteristic, and has a good discharge voltage decreasing effect. However, the aging characteristic is very much inferior to the base phosphor, which is formed only with the ZSM phosphor, thus it is possible to cause its life span shortening problem.

On the other hand, when mixing the YBT phosphor with the BAM-G phosphor, the result of the experiment carried out regarding optical characteristic, aging rate and electrical characteristic is shown as the following table 3.

TABLE 3

|  |  |  | ZSM (Base) | YBT:BAM-G (0.75:0.25) | YBT:BAM-G (0.5:0.5) |
|---|---|---|---|---|---|
| Optical Characteristic | Color Coordinate | X | 0.243 | 0.268 | 0.205 |
|  |  | Y | 0.715 | 0.649 | 0.699 |
|  | Initial Brightness (%) |  | 100 | 93~98 | 85~400 |
| Aging Rate | 72 (hr) |  | −13.4 | −16.5 | −22.5 |
| Electrical Characteristic | Discharge initiating voltage (V) |  | 240 | 203 | 199 |

As shown in Table 3, as the mixing rate of the BAM-G phosphor increases, its color reproduction property increases but is inferior to the ZSM phosphor. Further, its initial brightness value is lower than that of the YBT phosphor, and its aging brightness decreasing rate is lower than the base phosphor which is composed only of the ZSM phosphor. In addition, its electrical characteristic becomes excellent in comparison with the base phosphor.

After all, the optical characteristic of the two component compound of the YBT phosphor and the BAM-G phosphor is not much improved and its color purity characteristic becomes very much deteriorated due to the reciprocal counter-action of each component when compared with the base phosphor which is composed only of the ZSM phosphor. Also, it has an excellent discharge voltage decreasing effect, but the voltage decreasing effect becomes immaterial when the mixing rate of the BAM-G phosphor is not less than 25%. Accordingly, the two component compound of the YBT phosphor and the BAM-G phosphor does not have other advantage than the fact that the discharge initiating voltage decreases, in comparison with the base phosphor which is composed only of the ZSM phosphor, therefore it is unlikely to be applied for the plasma display panel.

As shown the above, in the result of experiment carried out in relation to the two component composition of mixing two phosphors among the ZSM phosphor, the YBT phosphor and the BAM-G phosphor, it is known that the optical characteristic and the aging rate and the electrical characteristic become excellent when the two component compound is composed of the ZSM phosphor and the YBT phosphor and the mixing rate of the YBT is 50 wt %.

Therefore, the present invention properly adjusts the mixing rate of the first class phosphor and the second class phosphor, and then changes the mixing rate of the third class phosphor to get the optimal composition rate of the mixed phosphor.

In relation to a three component compound of the first class phosphor, the second class phosphor and the third class phosphor, the result of the experiment carried out regarding optical characteristic, aging rate and electrical characteristic is shown as the following table 4.

TABLE 4

|  |  |  | ZSM (Base) | ZSM:YBT (0.5:0.5) | ZSM:YBT:BAM-G (0.44:0.44:0.12) | ZSM:YBT:BAM-G (0.38:0.38:0.25) |
|---|---|---|---|---|---|---|
| Optical Characteristic | Color Coordinate | X | 0.233 | 0.257 | 0.250 | 0.227 |
|  |  | Y | 0.726 | 0.693 | 0.694 | 0.717 |
|  | Initial Brightness (%) |  | 100 | 98-100 | 104 | 100 |
| Aging Rate | 72 (hr) |  | −15 | −1 | −2 | −10 |
| Electrical | Discharge |  | 236 | 222 | 218 | 221 |

TABLE 4-continued

| | ZSM (Base) | ZSM:YBT (0.5:0.5) | ZSM:YBT:BAM-G (0.44:0.44:0.12) | ZSM:YBT:BAM-G (0.38:0.38:0.25) |
|---|---|---|---|---|
| Characteristic | initiating voltage (V) | | | |

As shown in Table 4, when compared with the two component compound of the ZSM phosphor (the first class phosphor) and the YBT phosphor (the second class phosphor) with the same mixing rate, in the three component compound of the ZSM phosphor (the first class phosphor), the YBT phosphor (the second class phosphor) and the BAM-G phosphor (the third class phosphor), the color purity becomes excellent as the mixing rate of the BAM-G, which is selected as the third class phosphor, increases. Also, the initial brightness characteristic becomes excellent from 98-100% in case of the two component compound of the ZSM phosphor and the YBT phosphor with the same mixing ate, to 100% in case of the three component compound of the ZSM phosphor, the YBT phosphor and the BAM-G phosphor.

The aging rate is −1% in case of the two component compound of the ZSM phosphor and the YBT phosphor with the same mixing rate, and it is −2% when the composition rate of BAM-G is 0.12 in case the three component compound of the ZSM phosphor, the YBT phosphor and the BAM-G phosphor. So, there is not much different in the aging characteristic. Of course, it is −10% when the composition rate of the BAM-G is 0.25, so it is not better than its being −1% in case of the two component compound of the ZSM phosphor and the YBT phosphor. But, it is better than the base phosphor (ZSM phosphor).

The discharge initiating voltage decreases linearly as the mixing rate of the BAM-G decreases.

Accordingly, in the three component compound of the ZSM phosphor, the YBT phosphor and the BAM-G phosphor, the mixing rate of the BAM-G phosphor to the total composition is set to be within the scope of 1~25 wt %. Further, the mixing rate of the YBT phosphor to the ZSM phosphor is set to be within the scope of 25~80 wt %.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

The invention claimed is:

1. A plasma display panel, comprising:
a first substrate;
a plurality of first electrodes provided on the first substrate;
a plurality of second electrodes provided on the first substrate, the first and second electrodes being provided in a first direction;
a second substrate;
a plurality of address electrodes provided on the second substrate in a second direction, the first direction being different from the second direction;
a plurality of barrier ribs provided between the first substrate and the second substrate;
a plurality of discharge cells, defined by the barrier ribs, and having corresponding first, second and address electrodes, wherein the plurality of discharge cells comprise green discharge cells, red discharge cells and blue discharge cells;
a green phosphor material provided to the green discharge cells;
a red phosphor material provided to the red discharge cells; and
a blue phosphor material provided to the blue discharge cells,
wherein the green phosphor material comprises a first class phosphor material of $Zn_2SiO_4$:Mn, and a second class phosphor material comprising at least one of $LaPO_4$:Tb, $Y_3Al_3(BO_3)_4$Tb, $Y(Al, Ga)_5O_{12}$:Tb, $YBO_3$:Tb, or $(Y, Gd)BO_3$:Tb, and a third phosphor material comprising at least one of $BaAl_{12}O_{19}$:Mn, $BaAl_{14}O_{23}$:Mn, or $Ba(Sr, Mg)AlO$:Mn,
wherein the third class phosphor material to the total weight is greater than or equal to 1 wt % and less than 25 wt %.

2. A plasma display panel comprising:
a first substrate;
a plurality of first electrodes provided on the first substrate;
a plurality of second electrodes provided on the first substrate, the first and second electrodes being provided in a first direction;
a second substrate;
a plurality of address electrodes provided on the second substrate in a second direction, the first direction being different from the second direction;
a plurality of barrier ribs provided between the first substrate and the second substrate;
a plurality of discharge cells, defined by the barrier ribs, and having corresponding first, second and address electrodes, wherein the plurality of discharge cells comprise green discharge cells, red discharge cells and blue discharge cells;
a green phosphor material provided to the green discharge cells;
a red phosphor material provided to the red discharge cells; and
a blue phosphor material provided to the blue discharge cells,
wherein the green phosphor material comprises a first class phosphor material of $Zn_2SiO_4$:Mn, and a third class phosphor material,
the third class phosphor material comprising at least one of $BaAl_{12}O_{19}$:Mn, $BaAl_{14}O_{23}$:Mn, or $Ba(Sr,Mg)AlO$:Mn, and wherein
weight of the first class phosphor material to total weight is less than 100%,
wherein the third class phosphor material to the total weight is greater than or equal to 1 wt % and less than 25 wt %.

3. The plasma display panel of claim 2, wherein the second class phosphor material comprises $(Y, Gd)BO_3$:Tb or $Y_3Al_3(BO_3)_4$Tb;

and the third class phosphor material comprises $BaAl_{12}O_{19}$:Mn.

4. The plasma display panel of claim 2, wherein the second class phosphor to the first class phosphor is 25~80 wt %.

5. The plasma display panel of claim 3, wherein the second class phosphor to the first class phosphor is 25~80 wt %.

6. A plasma display panel, comprising:
a first substrate;
a plurality of first electrodes provided on the first substrate:
a plurality of second electrodes provided on the first substrate, the first and second electrodes being provided in a first direction;
a second substrate;
a plurality of address electrodes provided on the second substrate in a second direction, the first direction being different from the second direction;
a plurality of barrier ribs provided between the first substrate and the second substrate;
a plurality of discharge cells, defined by the barrier ribs, and having corresponding first, second and address electrodes, wherein the plurality of discharge cells comprise green discharge cells, red discharge cells and blue discharge cells;
a green phosphor material provided to the green discharge cells;
a red phosphor material provided to the red discharge cells; and
a blue phosphor material provided to the blue discharge cells,
wherein the green phosphor material comprises a first class phosphor material of $Zn_2SilO_4$:Mn, and a third class phosphor material,
the third class phosphor material comprising at least one of $BaAl_{14}O_{23}$:Mn, or Ba(Sr, Mg)AlO:Mn, and wherein weight of the first class phosphor material to total weight is less than 100%,
wherein the third class phosphor material to the total weight is 1~25 wt %.

7. A plasma display panel comprising:
a first substrate;
a plurality of first electrodes provided on the first substrate;
a plurality of second electrodes provided on the first substrate, the first and second electrodes being provided in a first direction;
a second substrate;
a plurality of address electrodes provided on the second substrate in a second direction, the first direction being different from the second direction;
a plurality of barrier ribs provided between the first substrate and the second substrate;
a plurality of discharge cells, defined by barrier ribs, and having corresponding first, second and address electrodes, wherein the plurality of discharge cells comprise green discharge cells, red discharge cells and blue discharge cells;
a green phosphor material provided to the green discharge cells;
a red phosphor material provided to the red discharge cells; and
a blue phosphor material provided to the blue discharge cells,
wherein the green phosphor material comprises a first class phosphor material of $Zn_2SilO_4$:Mn, and a second class phosphor material comprising at least one of $Y_3Al_3(BO_3)_4$:Tb, $Y(Al, Ga)_5O_{12}$:Tb, and $GdBO_3$:Tb, and a third phosphor material comprising at least one of $BaAl_{14}O_{23}$:Mn and Ba(Sr, Mg)AlO:Mn,
wherein the third class phosphor material to the total weight is 1~25 wt %.

* * * * *